United States Patent
Kim

(10) Patent No.: US 12,009,621 B2
(45) Date of Patent: *Jun. 11, 2024

(54) DEVICE AND METHOD OF ENSURING POWER DELIVERY IN UNIVERSAL SERIAL BUS INTERFACE

(71) Applicant: SAMSUNG ELECTRONICS CO., LTD., Suwon-si (KR)

(72) Inventor: Je-Kook Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 85 days.

This patent is subject to a terminal disclaimer.

(21) Appl. No.: 17/739,652

(22) Filed: May 9, 2022

(65) Prior Publication Data
US 2022/0263278 A1    Aug. 18, 2022

Related U.S. Application Data

(63) Continuation of application No. 16/364,231, filed on Mar. 26, 2019, now Pat. No. 11,329,438.

(30) Foreign Application Priority Data

Aug. 20, 2018   (KR) .................. 10-2018-0096825

(51) Int. Cl.
*H01R 13/713*   (2006.01)
*H01R 24/60*   (2011.01)
(Continued)

(52) U.S. Cl.
CPC ........ *H01R 13/7135* (2013.01); *H02H 1/0007* (2013.01); *H02H 7/20* (2013.01); *H01R 24/60* (2013.01); *H01R 2107/00* (2013.01)

(58) Field of Classification Search
CPC ............... H01R 13/7135; H01R 24/60; H01R 2107/00; H02H 1/0007; H02H 7/20;
(Continued)

(56) References Cited

U.S. PATENT DOCUMENTS 8,218,279 B2   7/2012   Liao et al.
9,584,016 B2   2/2017   Motoki
(Continued)

FOREIGN PATENT DOCUMENTS

CN      101179185      5/2008
CN      101820164      9/2010
(Continued)

OTHER PUBLICATIONS

Office Action in Korean Appln. No. 10-2018-0096825, dated Oct. 13, 2023, 9 pages (with English translation).
(Continued)

*Primary Examiner* — Dharti H Patel
(74) *Attorney, Agent, or Firm* — Fish & Richardson P.C.

(57) ABSTRACT

A method of ensuring power delivery in a universal serial bus (USB) interface between a device and a counterpart device, the device including a port controller and a USB receptacle. The method includes the port controller attempting to detect an abnormal state in which a leakage current occurs in the USB receptacle using at least one pin of the USB receptacle; and when the abnormal state is detected, the port controller turning OFF a switch connected between a power pin of the USB receptacle and an internal circuit of the device, and determining to enter an unattached state of being separated from the counterpart device.

20 Claims, 12 Drawing Sheets

(51) Int. Cl.
　　　*H01R 107/00*　　　(2006.01)
　　　*H02H 1/00*　　　(2006.01)
　　　*H02H 7/20*　　　(2006.01)

(58) Field of Classification Search
　　　CPC .... H02H 3/16; H02H 5/00; G06F 1/30; G06F 1/28; G06F 11/3058; G06F 2213/0042
　　　USPC ......................................................... 361/101
　　　See application file for complete search history.

(56) References Cited

U.S. PATENT DOCUMENTS

| | | | |
|---|---|---|---|
| 9,811,136 | B2 | 11/2017 | Waters et al. |
| 9,904,642 | B2 | 2/2018 | Chou et al. |
| 9,991,877 | B2 | 6/2018 | Kim et al. |
| 11,329,438 | B2 * | 5/2022 | Kim ................... H02H 1/0007 |
| 2015/0277935 | A1 * | 10/2015 | Desimone ............. G06F 13/382 710/313 |
| 2015/0318728 | A1 * | 11/2015 | Ghosh ....................... H02J 7/00 320/107 |
| 2016/0308452 | A1 | 10/2016 | Motoki |
| 2016/0342492 | A1 * | 11/2016 | Chen ................... G06F 13/4295 |
| 2017/0109311 | A1 | 4/2017 | Gerber et al. |
| 2017/0155214 | A1 | 6/2017 | Shen et al. |
| 2017/0194805 | A1 | 7/2017 | Kong et al. |
| 2017/0294832 | A1 | 10/2017 | Aoki |
| 2017/0336844 | A1 | 11/2017 | Koga |
| 2017/0363672 | A1 * | 12/2017 | Kim ........................ G01R 31/52 |
| 2017/0364114 | A1 | 12/2017 | Sporck et al. |
| 2018/0024899 | A1 | 1/2018 | Degura et al. |
| 2018/0048170 | A1 | 2/2018 | Sun et al. |
| 2018/0059771 | A1 | 3/2018 | Kim et al. |
| 2018/0060201 | A1 | 3/2018 | Newberry |
| 2018/0081326 | A1 | 3/2018 | Degura |
| 2018/0095511 | A1 | 4/2018 | Agarwal et al. |
| 2018/0102618 | A1 | 4/2018 | Maier |
| 2019/0004584 | A1 * | 1/2019 | Nge .................... G06F 13/4282 |
| 2019/0079123 | A1 * | 3/2019 | Kim ....................... G01R 31/68 |
| 2019/0079130 | A1 * | 3/2019 | Ko ......................... G01R 31/50 |
| 2020/0225295 | A1 * | 7/2020 | Hyun ..................... H01R 12/73 |
| 2022/0263278 | A1 * | 8/2022 | Kim .................... H01R 13/7135 |

FOREIGN PATENT DOCUMENTS

| | | | | |
|---|---|---|---|---|
| CN | 101963835 | | 2/2011 | |
| CN | 105867593 | | 8/2016 | |
| CN | 106026006 | A | 10/2016 | |
| CN | 106354591 | | 1/2017 | |
| CN | 107547755 | | 1/2018 | |
| CN | 107991571 | | 5/2018 | |
| CN | 109490699 | A * | 3/2019 | ............ G01R 27/02 |
| JP | 2017201862 | A | 11/2017 | |
| KR | 10-2006-0086478 | | 7/2006 | |
| KR | 10-2008-0058676 | | 6/2008 | |
| KR | 10-2016-0150379 | | 12/2016 | |
| KR | 10-2018-0016148 | | 2/2018 | |

OTHER PUBLICATIONS

Office Action in Chinese Appln. No. 201910297106.5, mailed on Feb. 29, 2024, 19 pages (with English translation).

\* cited by examiner

DEVICE AND METHOD OF ENSURING POWER DELIVERY IN UNIVERSAL SERIAL BUS INTERFACE

CROSS-REFERENCE TO RELATED APPLICATION

This is a Continuation of U.S. application Ser. No. 16/364,231, filed Mar. 26, 2019, which issued as U.S. Pat. No. 11,329,438 on May 10, 2022, and a claim of priority under 35 U.S.C. § 119 is made to Korean Patent Application No. 10-2018-0096825, filed on Aug. 20, 2018, in the Korean Intellectual Property Office, the entirety of which is hereby incorporated by reference.

BACKGROUND

The present disclosure relates to a universal serial bus (USB) interface, and more particularly to a device and method for ensuring power delivery in a USB interface.

A universal serial bus (USB) (or a USB standard) is a standard for defining cables, connectors, and communication protocols for communication between devices. USB interfaces are widely used in various applications. USB defines standards for power transfer as well as protocols for transmitting and receiving data, and a USB power delivery (PD) defines high power delivery such as 20V and 5 A, for example. However, when a conductive foreign material is introduced into a USB receptacle or a short circuit occurs in a USB cable, excessive power consumption may occur in a device functioning as a source for supplying power through a USB interface, the device may be damaged, and the USB receptacle and a USB plug may also be damaged.

SUMMARY

Embodiments of the inventive concepts provide a universal serial bus (USB) interface, and more particularly a device and method of stably performing power delivery in a USB interface.

Embodiments of the inventive concepts provide a method of ensuring power delivery in a universal serial bus (USB) interface between a device and a counterpart device, the device including a port controller and a USB receptacle. The method includes the port controller attempting to detect an abnormal state in which a leakage current occurs in the USB receptacle by using at least one pin of the USB receptacle; and, when the abnormal state is detected, the port controller turning OFF a switch connected between a power pin of the USB receptacle and an internal circuit of the device, and determining to enter an unattached state of being separated from the counterpart device.

Embodiments of the inventive concepts further provide a device that provides a universal serial bus (USB) interface, the device including a USB receptacle including a power pin; a switch connected between the power pin and an internal circuit of the device; and a port controller configured to detect an abnormal state in which leakage current occurs in the USB receptacle by using at least one pin of the USB receptacle and, when the abnormal state is detected, to turn OFF the switch and determine to enter an unattached state of being separated from a counterpart device.

Embodiments of the inventive concepts still further provide a port controller of a device, wherein the port controller is configured to detect an abnormal state in which a leakage current occurs in a USB receptacle of the device by using at least one pin of the USB receptacle other than a power pin of the USB receptacle and, to generate a switch control signal to turn OFF a switch connected between the power pin and an internal circuit of the device responsive to detection of the abnormal state.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
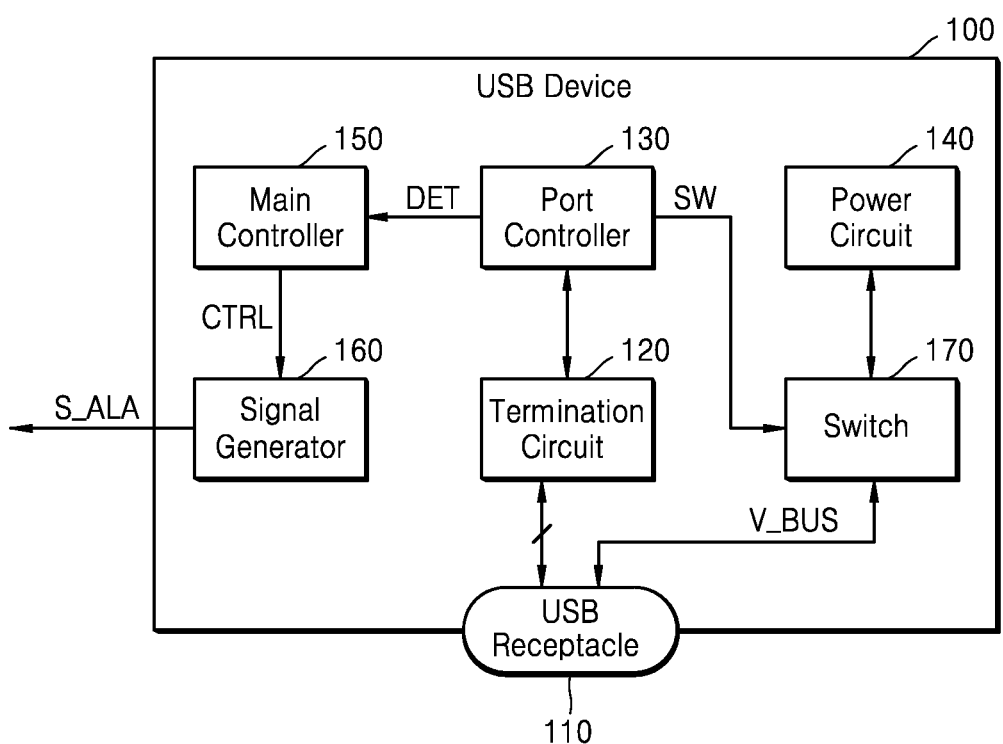
FIG. 1 illustrates a block diagram of a USB device according to embodiments of the inventive concepts.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 2:
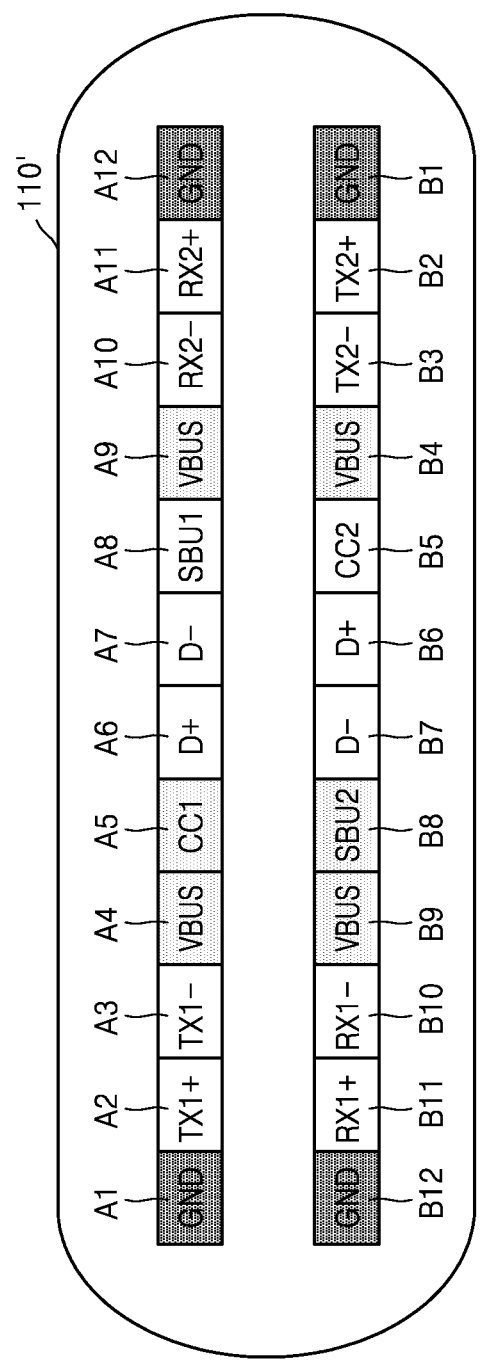
FIG. 2 illustrates a block diagram of an example of a USB receptacle of FIG. 1 according to embodiments of the inventive concepts.

FIG. 1 illustrates a block diagram showing a USB device 100 according to embodiments of the inventive concepts, and FIG. 2 illustrates a block diagram showing an example of a USB receptacle 110 of FIG. 1 according to embodiments of the inventive concepts. The USB device 100 is an arbitrary device capable of communicating with other devices via a USB interface and may be a stationary device (e.g., a desktop computer, a server, or any other stationary device that communicates via USB interface), may be a mobile device (e.g., a laptop computer, a mobile phone, a tablet PC, or any other mobile device that communicates via USB interface), or may be a component included in the above-mentioned devices and that provides a USB interface. As shown in FIG. 1, the USB device 100 includes a USB receptacle 110, a termination circuit 120, a port controller 130, a power circuit 140, a main controller 150, a signal generator 160, and a switch 170.

The USB receptacle 110 may be coupled to a USB cable or a USB plug, which is a portion of a USB entity, for connection with a counterpart USB entity. The USB receptacle 110 may include a plurality of exposed pins, and signals may be transmitted or received via the plurality of exposed pins. For example, as shown in FIG. 2, the USB receptacle 110 may include pins for transmitting transmission signals TX+ and TX− (i.e., signals TX1+, TX1−, TX2+ and TX2−), pins for receiving reception signals RX+ and RX− (i.e., signals RX1+, RX1−, RX2+ and RX2−), pins for channel constitution signals CC1 and CC2, pins for VBUS voltage V_BUS (i.e., VBUS), and pins for ground voltage (i.e., GND). In some embodiments, the USB receptacle 110 may have a pin arrangement according to the USB Type-C™ standard, as shown in FIG. 2, but other embodiments are not limited to a USB Type-C™ pin arrangement. In FIG. 2, the pins have been denoted as pins A1 through A12 and B1 through B12.

When a foreign material enters the USB receptacle 110 while a USB plug is not coupled to the USB receptacle 110, or when a short-circuit occurs in a USB cable coupled to the USB receptacle 110, two or more pins included in the USB receptacle 110 may be electrically connected to one another. Pins that are improperly and electrically connected to one another may cause leakage current, may interrupt communication via the USB interface, and may damage the USB device 100. Particularly, when the USB device 100 is a portable device or a component included in a portable device, a conductive material such as for example water and metal may easily penetrate into the USB receptacle 110, and thus excessive power consumption may occur and/or the USB device 100 may be damaged. In particular, once an attached state in which USB entities are attached to each other is established, even though a leakage current may occur, the USB Type-C™ standard does not regulate or take a measure to resolve the leakage current until the USB entities are in an unattached state in which the USB entities are separated from each other. Herein, the attached state may refer to a state in which the USB device 100 (or the port controller 130) determines that the USB device 100 is connected to the counterpart USB entity. The unattached state may refer to a state in which the USB device 100 (or the port controller 130) determines that the USB device 100 is separated from the counterpart USB entity.

The USB device 100 of the inventive concepts may detect an abnormal state where a leakage current may occur and may stop power transmission through the USB receptacle 110 when an abnormal state is detected. For example, when an abnormal state is detected, the switch 170 may electrically separate the power pin of the USB receptacle 110 that receives the VBUS voltage V_BUS or that outputs the VBUS voltage V_BUS, from the power circuit 140. Accordingly, unnecessary power consumption in the USB device 100 may be reduced, and the USB device 100 may be protected from damage due to excessive leakage current. It will be mainly described hereinafter that leakage current occurs due to a foreign object introduced into the USB receptacle 110, but it should be understood that in other cases leakage current may be due to other various factors and that the inventive concepts would also apply in such other cases.

The termination circuit 120 may be controlled by the port controller 130 and may provide the USB receptacle 110 with termination in accordance with USB requirements. For example, the termination circuit 120 may transmit channel constitution signals CC1 and CC2 to the USB receptacle 110 or transmit channel constitution signals CC1 and CC2 to the port controller 130, under the control of the port controller 130. The termination circuit 120 may also provide a VCONN voltage from the power circuit 140 to the USB receptacle 110 to provide power for an active cable under the control of the port controller 130.

The port controller 130 may control the termination circuit 120 by communicating with the termination circuit 120 and may control the USB interface according to signals received through the termination circuit 120. The port controller 130 may control port power supplied to the outside or received from the outside through the USB receptacle 110 or may process the channel constitution signals CC1 and CC2 according to the USB requirement. According to some embodiments, the port controller 130 may be a logic block implemented through logic synthesis, a processor, a software block contained in a memory that stores instructions executed by the processor, or a combination thereof. According to some embodiments, the port controller 130 may be referred to as a power delivery integrated circuit (PDIC). Also, according to some embodiments, the termination circuit 120 and the port controller 130 may be included in one integrated circuit, and such an integrated circuit may be referred to as a PDIC.

According to some embodiments, the port controller 130 may detect an abnormal condition where a leakage current may occur. For example, as will be subsequently described with reference to FIG. 7, the port controller 130 may apply a test signal to at least one pin, receive a response to the test signal from the at least one pin, and detect an abnormal state based on the received response. Also, as will be subsequently described with reference to FIG. 9, the port controller 130 may detect the impedance between two pins included in the USB receptacle 110 and may detect an abnormal state based on the detected impedance.

The power circuit 140 may be electrically connected to the power pin of the USB receptacle 110 via the switch 170. According to some embodiments, when the USB device 100 supports an upload faced port (UFP), the power circuit 140 may receive the VBUS voltage V_BUS from the power pin of the USB receptacle 110 through the switch 170 and may also distribute the power supplied by the VBUS voltage V_BUS to other components of the USB device 100. According to some embodiments, when the USB device 100 supports a download faced port (DFP), the power circuit 140 may provide the VBUS voltage V_BUS to the power pin of the USB receptacle 110 through the switch 170. According to some embodiments, the USB device 100 may support a dual role port (DRP) capable of switching between a source (or a host) and a sink (or a device). In addition, the power circuit 140 may generate a VCONN voltage, which provides power for an active cable, and provide the VCONN voltage to the termination circuit 120. The VCONN voltage may be supplied to a CC1 pin (e.g., A5 of FIG. 2) or a CC2 pin (e.g., B5 of FIG. 2) of the USB receptacle 110 by the operation of the termination circuit 120 under the control of the port controller 130. In this specification, a positive supply voltage that transfers power like the VBUS voltage V_BUS and the VCONN voltage may be referred to as a power source voltage.

The switch 170 may be connected between a power pin included in the USB receptacle 110 and the power circuit 140 and may be turned ON or OFF according to a switch control signal SW provided from the port controller 130. For example, the switch 170 may be turned ON in response to an activated switch control signal SW, and thus the power pin and the power circuit 140, which is an internal circuit of the USB device 100, may be electrically connected to each other. On the other hand, the switch 170 may be turned OFF in response to a deactivated switch control signal SW, and thus, the power pin and the power circuit 140 may be electrically disconnected. As described below with reference to FIG. 5, the port controller 130 may turn OFF the switch 170 when an abnormal state is detected, thereby preventing occurrence of leakage current from the power supply voltage.

The main controller 150 may generate transmission signals TX+ and TX− or may process reception signals RX+ and RX− and may communicate with the port controller 130. For example, the main controller 150 may include a USB port manager, and the USB port manager may operate a port policy and a USB PD (power delivery) protocol by communicating with the port controller 130. A state machine of the USB interface may be implemented collectively by the main controller 150 and the port controller 130.

The main controller 150 may receive a detection signal DET from the port controller 130 and perform a needed operation according to the detection signal DET. In some embodiments, when an activated detection signal DET indicating an occurrence of an abnormal state in the USB receptacle 110 is received from the port controller 130, the main controller 150 may generate an alarm control signal CTRL and provide the alarm control signal CTRL to the signal generator 160, such that the signal generator 160 generates an alarm signal S_ALA. Also, according to some embodiments, the port controller 130 may stop generating the power supply voltage by controlling the power circuit 140 in response to the activated detection signal DET.

The signal generator 160 may generate the alarm signal S_ALA that may be recognized by a user of the USB device 100 according to the alarm control signal CTRL provided from the main controller 150. According to some embodiments, the alarm signal S_ALA may be a sound, and the signal generator 160 may include for example a speaker and/or a buzzer for outputting sound. According to some embodiments, the alarm signal S_ALA may be a visible signal and the signal generator 160 may include a display component such as for example a liquid crystal display (LCD) and/or a lamp like a light emitting device (LED). When the signal generator 160 includes a display component, an alarm window may be displayed on the display component according to the alarm control signal CTRL. Also, according to some embodiments, the alarm signal S_ALA may be vibration of the USB device 100, and the signal generator 160 may include a component that generates vibration, e.g., a motor.

Referring to FIG. 2, a USB receptacle 110' may have a structure complying with USB Type-C™. The USB receptacle 110' may have a symmetrical pin arrangement, and thus the USB receptacle 110' and a USB plug may be normally coupled with each other in any direction. The USB receptacle 110' may include a TX1+ pin A2, a TX1− pin A3, an RX1+ pin B11, an RX1− pin B10, a TX2+ pin B2, a TX2− pin B3, an RX2+ pin A11, and an RX2− pin A10 as data buses. The USB receptacle 110' may include VBUS pins A4, A9, B4, and B9 as power buses, wherein a CC1 pin A5 or a CC2 pin B5 may transfer a VCONN voltage depending on a direction in which the USB receptacle 110' is coupled with a USB plug. Furthermore, the USB receptacle 110' may include two sideband use (SBU) pins A8 and B8 respectively for SBU1 and SBU2 and include two configuration channel (CC) pins A5 and B5. The CC1 pin A5 and the CC2 pin B5 may be collectively referred to as CC pins. Unlike the USB receptacle 110', a USB plug coupled with the USB receptacle 110' may include one channel configuration pin CC and may include a dedicated VCONN pin. The USB receptacle 110' further includes pins A6 and A7 as a first differential pair D+ and D−, and pins B6 and B7 as a second differential pair D+ and D−. Finally, the USB receptacle 110' may include four ground pins A1, A12, B1, and B12 disposed on the outside. The four VBUS pins A4, A9, B4, and B9 may be electrically connected to one another (i.e., the four VBUS pins A4, A9, B4, and B9 may have an equal potential) within the USB receptacle 110' or at the termination circuit 120 of FIG. 1. The four ground pins A1, A12, B1, and B12 may also be electrically connected to one another within the USB receptacle 110' or at the termination circuit 120 of FIG. 1.

As described above, when a foreign object is introduced into the USB receptacle 110' or a short circuit occurs in a USB cable connected to the USB receptacle 110', leakage current may occur, and in particular, when an electrical path is formed between power pins (that is, the VBUS pins A4, A9, B4, and B9 and the CC1 pin A5 or the CC2 pin B5 that supplies the VCONN voltage) and other pins (e.g., the ground pins A1, A12, B1, and B12), leakage current may be significantly increased.

Figure 3:
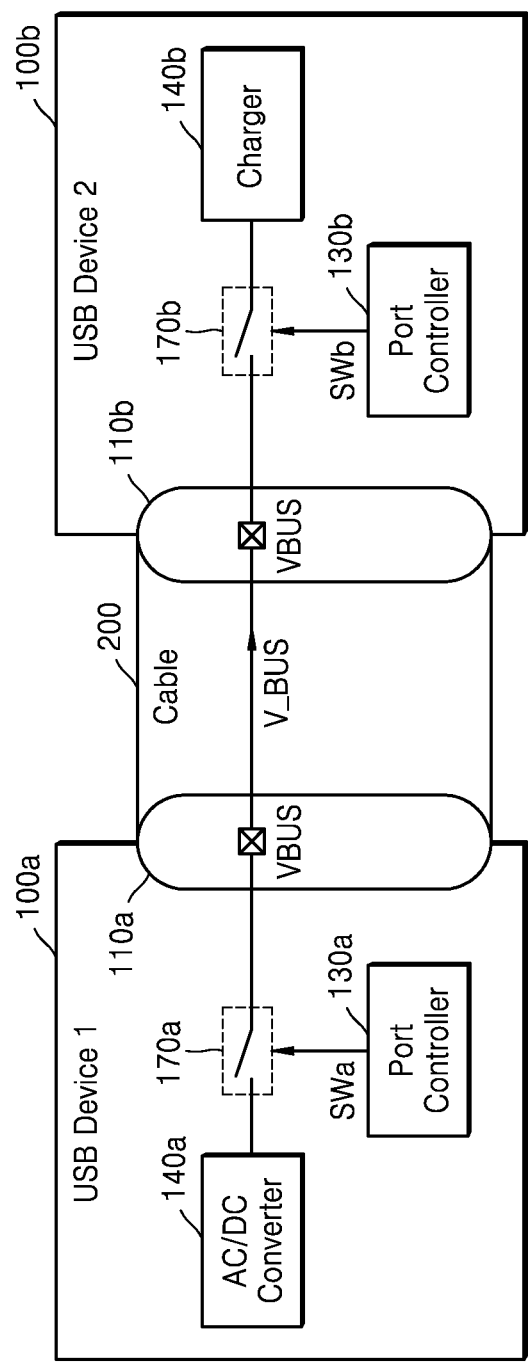
FIG. 3 illustrates a block diagram showing USB devices connected through a USB interface according to embodiments of the inventive concepts.

FIG. 3 illustrates a block diagram showing first and second USB devices 100a and 100b connected through a USB interface according to embodiments of the inventive concepts. In detail, FIG. 3 shows the first USB device 100a (i.e., USB Device 1) that functions as a source (or a host) and the second USB device 100b (i.e., USB Device 2) that functions as a sink (or a device), wherein the first USB device 100a and the second USB device 100b are connected to each other via a cable 200 (i.e., a USB interface). The USB device 100 described above with reference to FIG. 1 may function as a source like the first USB device 100a of FIG. 3 or may function as a sink like the second USB device 100b.

Referring to FIG. 3, the first USB device 100a includes a USB receptacle 110a, a port controller 130a, an AC/DC converter 140a, and a switch 170a. To provide the VBUS voltage V_BUS to the second USB device 100b, the AC/DC converter 140a may generate the VBUS voltage V_BUS, which is a DC voltage, from an AC voltage. According to some embodiments, the first USB device 100a may include a battery and, to generate the VBUS voltage V_BUS from a DC voltage, may include a DC/DC converter or a linear regulator instead of the AC/DC converter 140a.

The port controller 130a may control the switch 170a through a switch control signal SWa. The port controller 130a may generate a deactivated switch control signal SWa when an abnormal state occurs, and thus, as the switch 170a is turned OFF, the AC/DC converter 140a, which is an internal circuit of the first USB device 100a, and the VBUS pins may be disconnected, and the VBUS voltage V_BUS generated by the AC/DC converter 140a may not be output through the VBUS pins of the USB receptacle 110a. Thus, leakage current due to the VBUS voltage V_BUS may be prevented.

The second USB device 100b may include a USB receptacle 110b, a port controller 130b, a charger 140b, and a switch 170b. The charger 140b may charge a battery included in the second USB device 100b from the VBUS voltage V_BUS provided from the first USB device 100a. According to some embodiments, the second USB device 100b may include a circuit (e.g., a voltage regulator) for generating one or more supply voltages for providing power to other components included in the second USB device 100b from the VBUS voltage V_BUS provided from the first USB device 100a.

The port controller 130b may control the switch 170b through a switch control signal SWb. The port controller 130b may generate a deactivated switch control signal SWb when an abnormal state occurs, and thus, as the switch 170b is turned OFF, the charger 140b, which is an internal circuit of the second USB device 100b, and the VBUS pins may be disconnected, and the VBUS voltage V_BUS provided from the first USB device 100a may not be provided to the charger 140b and other internal circuits of the second USB device 100b. Thus, leakage current due to the VBUS voltage V_BUS may be prevented.

Hereinafter, one or more embodiments will be described primarily with reference to a USB device functioning as a source like the first USB device 100a of FIG. 3. However, it should be understood that other embodiments may be applied to a USB device functioning as a sink like the second USB device 100b of FIG. 3.

Figure 4:
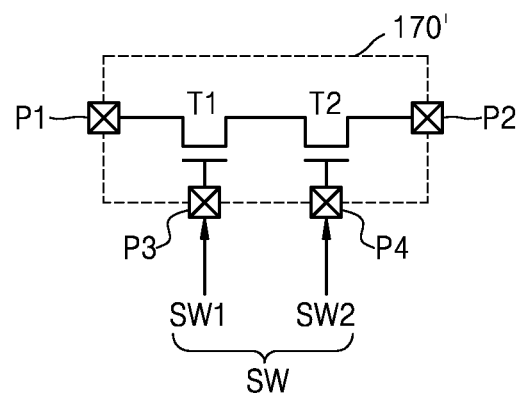
FIG. 4 illustrates a diagram showing an example of the switch of FIG. 1 according to embodiments of the inventive concepts.

FIG. 4 illustrates a diagram showing an example of the switch 170 of FIG. 1 according to embodiments of the inventive concepts. As described above with reference to FIG. 1, a switch 170' of FIG. 4 may receive a switch control signal SW from the port controller 130 and may be turned ON or OFF according to the switch control signal SW.

Referring to FIG. 4, the switch 170' includes a first transistor T1 and a second transistor T2 connected in series between a first terminal P1 and a second terminal P2. The switch control signal SW may be provided to control terminals P3 and P4 of the first transistor T1 and the second transistor T2, and the first terminal P1 and the second terminal P2 may be electrically connected to each other according to the switch control signal SW. Although FIG. 4 shows that the switch 170' includes two N-channel metal oxide semiconductor (NMOS) transistors, according to some embodiments, the switch 170' may include P-channel metal oxide semiconductors (PMOS) transistors, or may include a NMOS transistor and a PMOS transistor that are connected to each other in parallel. In some embodiments, the switch 170' may include more than two transistors connected in series between the first terminal P1 and the second terminal P2.

As shown in FIG. 4, the switch control signal SW may include a first switch control signal SW1 and a second switch control signal SW2. According to some embodiments, the port controller 130 of FIG. 1 may turn ON or OFF the first transistor T1 and the second transistor T2 at different time points. For example, the port controller 130 may generate the first switch control signal SW1 and the second switch control signal SW2, such that the second transistor T2 is turned ON after the first transistor T1 is turned ON. Similarly, the port controller 130 may generate the first switch control signal SW1 and the second switch control signal SW2, such that the first transistor T1 is turned OFF after the second transistor T2 is turned OFF.

Figure 5:
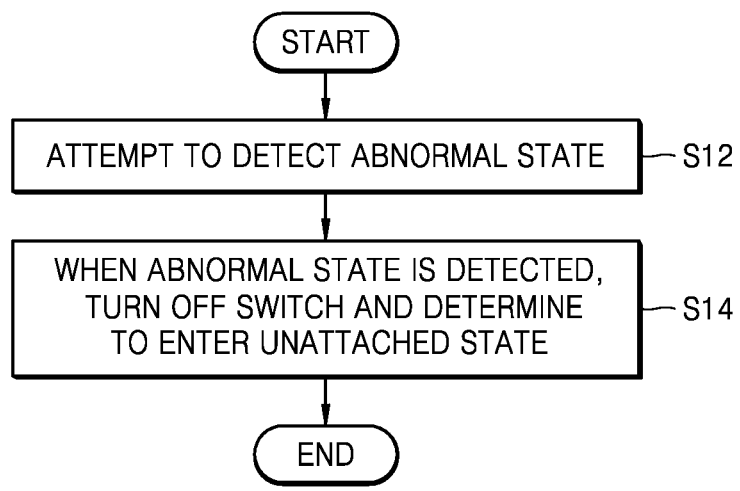
FIG. 5 illustrates a flowchart of a method of ensuring power delivery at a USB interface, according to embodiments of the inventive concepts.

FIG. 5 illustrates a flowchart of a method of ensuring power delivery (PD) at a USB interface between USB device 100 and a counterpart USB device according to embodiments of the inventive concepts. For example, the method of FIG. 5 may be performed by the port controller 130 of FIG. 1, and hereinafter, FIG. 5 will be described with reference to FIG. 1.

In operation S12, an operation for attempting to detect an abnormal state is performed. As described above with reference to FIG. 1, an abnormal state may refer to a state where leakage current may occur in the USB receptacle 110, and a state other than the abnormal state may be referred to as a normal state. The port controller 130 may detect an abnormal state in various ways. For example, as disclosed in U.S. patent application Ser. Nos. 15/981,157; 16/025,335; and 16/053,155 and Korean Patent Application KR 10-2018-0062092, which are incorporated herein by reference in their entirety, and are by applicant, the port controller 130 may detect an abnormal state. Examples of the operation in which the port controller 130 detects an abnormal state will be hereinafter described with reference to FIGS. 7 to 10. In some embodiments, operation S12 may be performed when there is no signal transmission/reception for a certain period of time. For example, an operation of detecting the unattached state is performed after the switch 170 is turned ON, and operation S12 may be performed when there is no signal transmission/reception for the certain period of time after the unattached state is not detected When an abnormal state is detected in operation S12, in operation S14 an operation for turning OFF the switch 170 and determining to enter an unattached state of the USB entities (i.e., the USB device 100 and the counterpart USB device) is performed. As described above with reference to FIGS. 1 and 3, the switch 170 may be between power pins included in the USB receptacle 110 and the internal circuit of the USB device 100, that is the power circuit 140, and the port controller 130 may turn OFF the switch 170 to prevent an occurrence of leakage current and/or damage caused by the leakage current upon detection of an abnormal state. Also, the port controller 130 may turn OFF the switch 170 and determine to enter an unattached state of being separated from each other. For example, even when the USB device 100 is in an attached state of being connected to the counterpart USB device through a cable, when an abnormal state is detected, the switch 170 may be switched to OFF. That is, conventionally the USB device 100 would enter an unattached state when a separation condition specified by USB Type-C™ standard is satisfied. In contrast, in embodiments of the inventive concepts, when an abnormal state is detected, the switch 170 is turned OFF and the USB entities also enter an unattached state. Here, as described, an abnormal state may refer to a state where leakage current occurs in the USB receptacle 110. In other words, detection of an abnormal state may be newly included in the separation condition.

Figure 6:
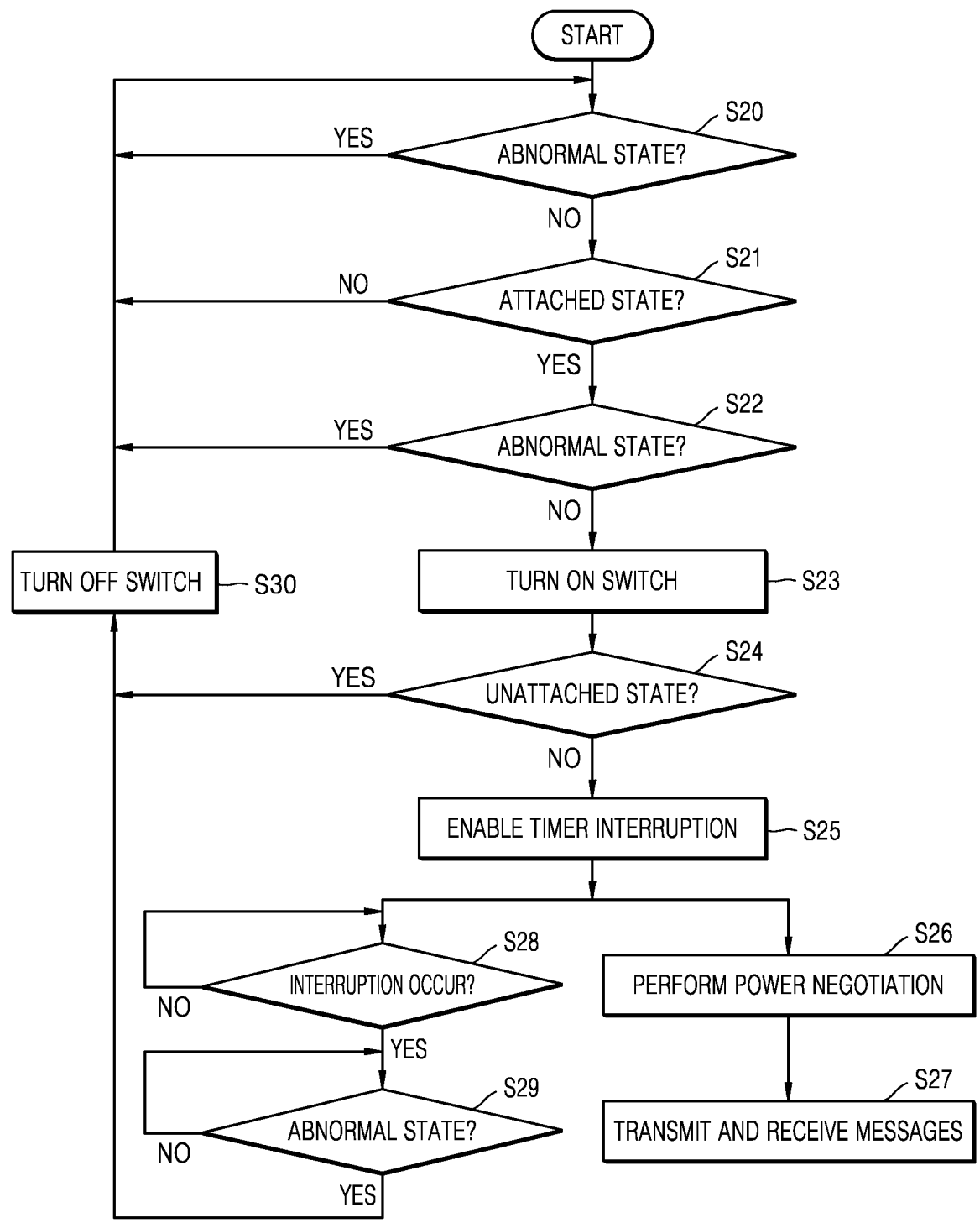
FIG. 6 illustrates a flowchart of a method of performing connection and disconnection at a USB interface, according to embodiments of the inventive concepts.

FIG. 6 illustrates a flowchart of a method of performing connection and disconnection at a USB interface according to embodiments of the inventive concepts. As described hereinafter with reference to FIG. 6, at least one operation for determining whether there is an abnormal state may be added to a common method of performing connection and disconnection. For example, the method of FIG. 6 may be performed by the USB device 100 of FIG. 1, and hereinafter, FIG. 6 will be described with reference to FIG. 1.

Referring to FIG. 6, an operation for determining whether there is an abnormal state in the USB receptacle 110 is performed in operation S20. That is, even in an unattached state of the USB device 100 not being connected to a counterpart USB device, an operation for determining whether there is an abnormal state, that is, an operation for attempting to detect an abnormal state may be performed. According to some embodiments, operation S20 may be performed at pre-set intervals, or in other words may be repeated at a pre-set period. As shown in FIG. 6, when an abnormal state is detected (Yes in S20), operation S20 is repeated periodically or aperiodically. Otherwise, when an abnormal state is not detected (No in S20), operation S21 is performed subsequently.

In operation S21, an operation for determining whether the USB device 100 is in an attached state of being connected to the counterpart USB device is performed. For example, the USB device 100 may determine whether the USB device 100 is in an attached state of being connected to the counterpart USB device by using channel constitution signals CC1 and CC2. For example, when the USB device 100 recognizes a sync CC termination Rd of the counterpart USB device through one of the channel constitution signals CC1 and CC2, the USB device 100 may recognize that the counterpart USB device is connected as a sink. As shown in FIG. 6, when the USB device 100 is not in the attached state (No in S21), operation S20 is performed subsequently. Otherwise, when the USB device 100 is in the attached state (Yes in S21), operation S22 is performed immediately thereafter.

In operation S22, an operation for determining whether there is an abnormal state in the USB receptacle 110 is performed. Unlike in operation S20, an operation for determining whether there is an abnormal state in an attached state, that is, an operation for attempting to detect an abnormal state may be performed. As shown in FIG. 6, when an abnormal state is detected (Yes in S22), operation S20 is performed subsequently. Otherwise, when an abnormal state is not detected (No in S22), operation S23 is performed subsequently.

In operation S23, an operation for turning ON the switch 170 is performed. Accordingly, when both the attached state and the normal state are satisfied, the switch 170 may be turned ON and, as a result, the VBUS voltage V_BUS may be provided to the counterpart USB device. Accordingly, the VBUS voltage V_BUS may be prevented from being output through the power pins of the USB receptacle 110 when the USB receptacle 110 is in an abnormal state.

In operation S24, an operation for determining whether the USB device 100 is in the unattached state of being separated from the counterpart USB device is performed. For example, the USB device 100 may determine whether the USB device 100 is in the unattached state of being separated from the counterpart USB device by using the channel constitution signals CC1 and CC2. For example, when the USB device 100 fails to recognize the sync CC termination Rd through one of the channel constitution signals CC1 and CC2, it may be determined that the USB device 100 is in the unattached state. As shown in FIG. 6, when it is determined that the USB device 100 is in the unattached state (Yes in S24), operation S30 is performed subsequently. Otherwise, when it is determined that the USB device 100 is not in the unattached state (No in S24), operation S25 is performed subsequently.

When it is determined in operation S24 that the USB device 100 is not in the unattached state (or it is determined as being in the attached state), an operation for enabling a timer is performed in operation S25. For example, a timer may be reset and run. A timer interruption may be used to periodically determine whether there is an abnormal state. When an interruption has occurred, it is determined whether there is an abnormal state. Following operation S25, operation S28 and operation S26 may be performed in parallel.

Power negotiation is performed in operation S26. During the power negotiation, the USB device 100 and the counterpart USB device may determine the magnitude of the VBUS voltage V_BUS, the magnitude of a current, and other conditions. Next, an operation for transmitting and receiving messages is performed in operation S27 after the conditions determined in operation S26 are set.

In parallel with operation S26 and operation S27, it is determined in operation S28 whether a timer interruption occurs. For example, it is determined whether the timer goes off. When an interruption has not occurred (No in S28), operation S28 is repeated. When an interruption has occurred (Yes in S28), operation S29 is performed. An operation for determining whether there is an abnormal state is performed in operation S29. That is, the port controller 130 may periodically attempt to detect an abnormal state during normal communication through the USB interface in the attached state. When an abnormal state is detected (Yes in S29), operation S30 is performed subsequently.

When the unattached state is determined in operation S24 or when an abnormal state is determined in operation S29, an operation for turning OFF the switch 170 is performed in operation S30. Since the switch 170 is turned ON in operation S23 and it is determined in operation S24 that the USB device 100 is in the unattached state, as the switch 170 is turned OFF in operation S30, outputting of the VBUS voltage V_BUS through the power pins is stopped. In addition, since it is determined in operation S29 that the abnormal state is present, as the switch 170 is turned OFF in operation S30, outputting of the VBUS voltage V_BUS through the power pins is stopped. Following operation S30, operation S20 is performed.

Figure 7:
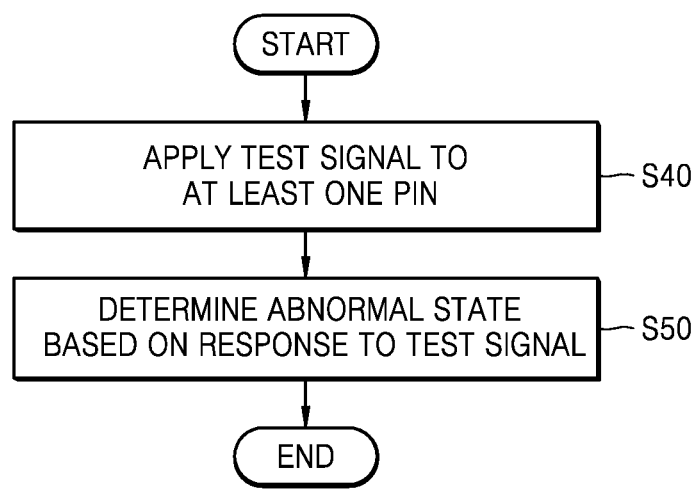
FIG. 7 illustrates a flowchart of a method of detecting an abnormal state, according to embodiments of the inventive concepts.

FIG. 7 illustrates a flowchart of a method of detecting an abnormal state, according to embodiments of the inventive concepts. For example, the method of FIG. 7 may be an example of operation S12 of FIG. 5, and operation S20, operation S22, and operation S29 of FIG. 6. According to some embodiments, the method of FIG. 7 may be performed by the port controller 130 of FIG. 1, and hereinafter, FIG. 7 will be described with reference to FIG. 1.

Referring to FIG. 7, in operation S40, an operation for applying a test signal to at least one pin is performed. According to some embodiments, the port controller 130 may directly apply test signals to an arbitrary pin from among pins included in the USB receptacle 100 other than power pins, or may control the termination circuit 120 to apply a test signal thereto. For example, the port controller 130 may apply a test signals to at least one of a CC1 pin, a CC2 pin, a D+ pin, a D− pin, an SBU1 pin, an SBU2 pin, a TX1+ pin, a TX1− pin, a TX2+ pin, a TX2− pin, an RX1+ pin, an RX1− pin, an RX2+ pin, and an RX2− pin. The examples of operation S40 will be described subsequently with reference to FIGS. 8A and 8B.

In operation S50, an operation for determining whether there is an abnormal state based on a response to the test signal is performed. For example, the port controller 130 may receive a response to the test signal from at least one pin and may determine (i.e., detect) whether there is an abnormal state based on the received response. The examples of operation S50 will be described subsequently with reference to FIGS. 8A and 8B.

Figure 8A:
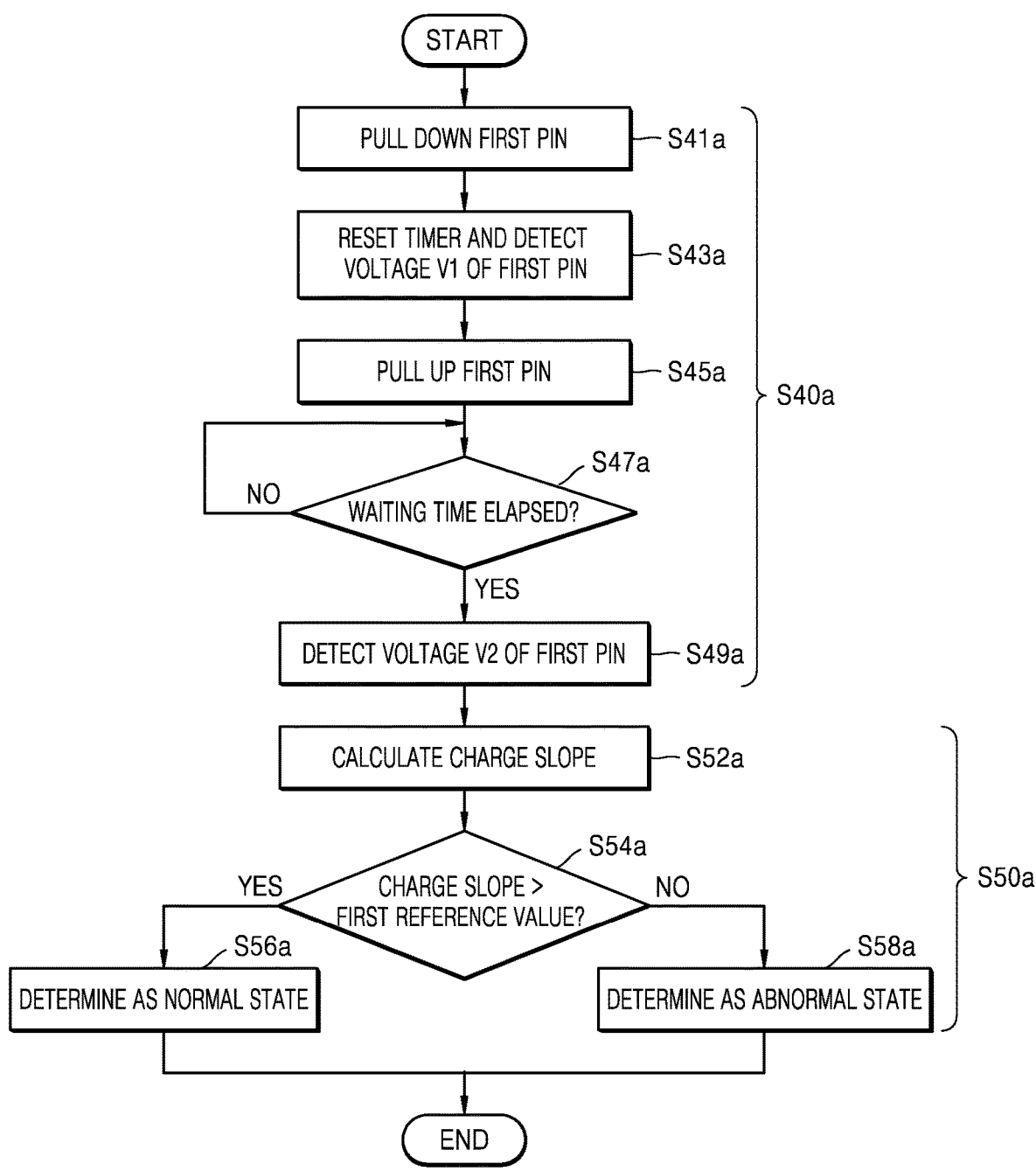
FIG. 8A illustrates a flowchart of a method of detecting an abnormal state, according to embodiments of the inventive concepts.
Figure 8B:
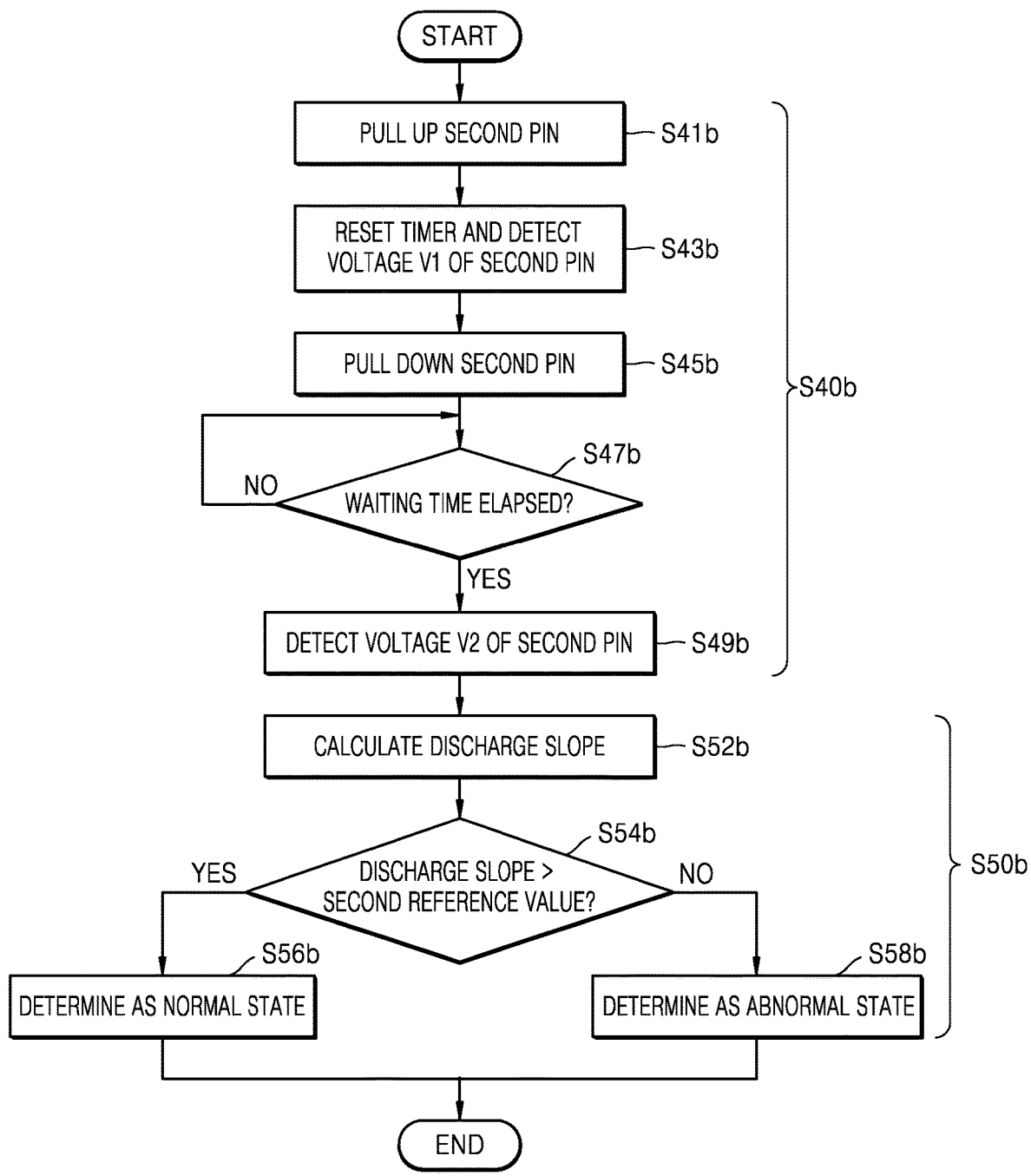
FIG. 8B illustrates a flowchart of another method of detecting an abnormal state, according to embodiments of the inventive concepts.

FIGS. 8A and 8B illustrate flowcharts of methods of detecting an abnormal state, according to embodiments of the inventive concepts. For example, the method of FIG. 8A includes operation S40a and operation S50a as respective examples of operation S40 and operation S50 of FIG. 7, and the method of FIG. 8B includes operation S40b and operation S50b as respective examples of operation S40 and operation S50 of FIG. 7. Specifically, an abnormal state may be detected by charging at least one pin in FIG. 8A, whereas an abnormal state may be detected by discharging at least one pin in FIG. 8B. Hereinafter, in the descriptions of FIGS. 8A and 8B hereinafter, duplicate description may be omitted.

Referring to FIG. 8A, operation S40a includes a plurality of operations including operation S41a, operation S43a, operation S45a, operation S47a, and operation S49a. In operation S41a, an operation for pulling down a first pin is performed. For example, the port controller 130 may pull down the first pin by using a switch circuit, a resistor, and/or a current source included in the termination circuit 120. According to some embodiments, the first pin may be an arbitrary pin from among pins included in the USB receptacle 110 other than power pins.

In operation S43a, an operation for resetting a timer and detecting a voltage V1 of the first pin is performed. The voltage V1 of the first pin detected in operation S43a may be referred to as a first voltage V1. Since the first pin is pulled down in operation S41a, the first voltage V1 may have a relatively low level. As described below, a timer may be reset, such that the voltage of the first pin rises from the first voltage V1 during a certain waiting time.

In operation S45a, an operation for pulling up the first pin is performed. For example, the port controller 130 may pull up the first pin by using a switch circuit, a resistor, and/or a current source included in the termination circuit 120. Accordingly, the voltage of the first pin may gradually rise from the first voltage V1.

In operation S47a, an operation for determining whether the waiting time has elapsed is performed. As shown in FIG. 8A, when the waiting time has not elapsed (No in S47a), operation S47a may be performed again. Otherwise, when the waiting time has elapsed (Yes in S47a), operation S49a is performed subsequently. That is, the port controller 130 waits until a timer that has been reset in operation S43a times out and, when the timer times out, performs operation S49a.

In operation S49a, an operation for detecting a voltage V2 of the first pin is performed. The voltage detected in operation S49a may be referred to as a second voltage V2. The voltage of the first pin may rise from the first voltage V1 to the second voltage V2 during the waiting time, and thus the second voltage V2 may have a level higher than that of the first voltage V1. When there is no foreign object in the USB receptacle 110 (that is, a normal state), the first pin may be in an open state, and thus the voltage of the first pin may rise relatively fast while the first pin is being pulled up. On the other hand, when there is a foreign object in the USB receptacle 110, (that is, an abnormal state), the first pin may have an increased capacitance due to the foreign object, and thus the voltage of the first pin may rise relatively slow while the first pin is being pulled up.

As shown in FIG. 8A, operation S50a includes a plurality of operations, that is, operation S52a, operation S54a, operation S56a, and operation S58a. In operation S52a, an operation for calculating a charge slope is performed. For example, the port controller 130 may calculate a charge slope by dividing a difference between the second voltage V2 and the first voltage V1 by the waiting time. As described above, in the normal state, since the voltage of the first pin may rise relatively fast, the charge slope may have a relatively large value. In contrast, in the abnormal state, the voltage of the first pin may rise relatively slowly, and thus the charge slope may have a relatively small value.

In operation S54a, an operation for comparing the charge slope with a first reference value is performed. When the charge slope is greater than the first reference value (that is, when the voltage of the first pin rises relatively fast) (Yes in S54a), it is determined that there is no foreign object contacting the first pin, and thus the normal state is determined in operation S56a. On the other hand, when the charge slope is less than the first reference value (that is, when the voltage of the first pin rises relatively slowly) (No in S54a), it is determined that there is a foreign object contacting the first pin, and thus the abnormal state may be determined in operation S58a.

Referring to FIG. 8B, operation S40b includes a plurality of operations including operation S41b, operation S43b, operation S45b, operation S47b, and operation S49b. In operation S41b, an operation for pulling up a second pin is performed. For example, the port controller 130 may pull up the second pin by using a switch circuit, a resistor, and/or a current source included in the termination circuit 120. According to some embodiments, the second pin may be an arbitrary pin from among pins included in the USB receptacle 110 other than power pins.

In operation S43b, an operation for resetting a timer and detecting a voltage V1 of the second pin is performed. The voltage V1 of the second pin detected in operation S43b may be referred to as a first voltage V1. Since the second pin is pulled up in operation S41b, the first voltage V1 may have a relatively high level. As described below, a timer may be reset, such that the voltage of the second pin drops from the first voltage V1 during a certain waiting time.

In operation S45b, an operation for pulling down the second pin is performed. For example, the port controller 130 may pull down the second pin by using a switch circuit, a resistor, and/or a current source included in the termination circuit 120. Accordingly, the voltage of the second pin may gradually drop from the first voltage V1.

In operation S47b, an operation for determining whether the waiting time has elapsed is performed. As shown in FIG. 8B, when the waiting time has not elapsed (No in S47b), operation S47b may be performed again. In contrast, when the waiting time has elapsed (Yes in S47b), operation S49b is performed subsequently. That is, the port controller 130 waits until a timer that has been reset in operation S43b times out and, when the timer times out, performs operation S49b.

In operation S49b, an operation for detecting a voltage V2 of the second pin is performed. The voltage detected in operation S49b may be referred to as a second voltage V2. The voltage of the second pin may drop from the first voltage V1 to the second voltage V2 during the waiting time, and thus the second voltage V2 may have a level lower than that of the first voltage V1. When there is no foreign object in the USB receptacle 110 (that is, a normal state), the second pin may be in an open state, and thus the voltage of the second pin may drop relatively fast while the second pin is being pulled down. On the other hand, when there is a foreign object in the USB receptacle 110, (that is, an abnormal state), the second pin may have an increased capacitance due to the foreign object, and thus the voltage of the second pin may drop relatively slow while the second pin is being pulled down.

As shown in FIG. 8B, operation S50b includes a plurality of operations, that is, operation S52b, operation S54b, operation S56b, and operation S58b. In operation S52b, an operation for calculating a discharge slope is performed. For example, the port controller 130 may calculate a discharge slope by dividing a difference between the first voltage V1 and the second voltage V2 by the waiting time. As described above, in the normal state, since the voltage of the second pin may drop relatively fast, the discharge slope may have a relatively large value. In contrast, in the abnormal state, the voltage of the second pin may drop relatively slowly, and thus the discharge slope may have a relatively small value.

In operation S54b, an operation for comparing the discharge slope with a second reference value is performed. When the discharge slope is greater than the second reference value (that is, when the voltage of the second pin drops relatively fast) (Yes in S54b), it is determined that there is no foreign object contacting the second pin, and thus the normal state is determined in operation S56b. On the other hand, when the discharge slope is less than the second reference value (that is, when the voltage of the second pin drops relatively slowly) (No in S54b), it is determined that there is a foreign object contacting the second pin, and thus the abnormal state is determined in operation S58b.

Figure 9:
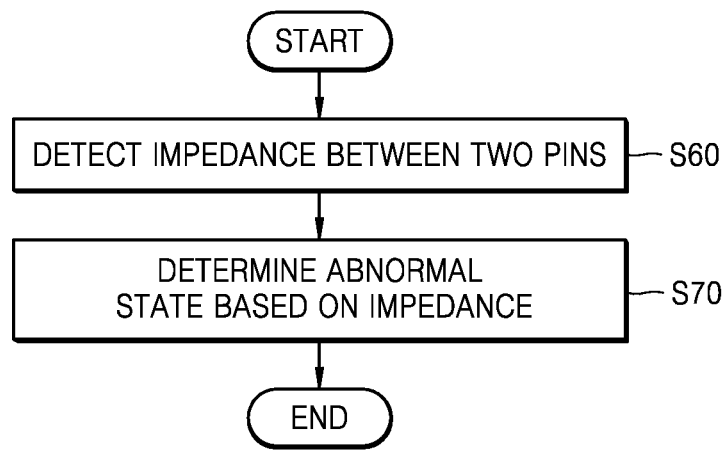
FIG. 9 illustrates a flowchart of a method of detecting an abnormal state, according to embodiments of the inventive concepts.

FIG. 9 illustrates a flowchart of a method of detecting an abnormal state, according to embodiments of the inventive concepts. For example, the method of FIG. 9 may be an example of operation S12 of FIG. 5, and operation S20, operation S22, and operation S29 of FIG. 6. According to some embodiments, the method of FIG. 9 may be performed by the port controller 130 of FIG. 1, and hereinafter, FIG. 9 will be described with reference to FIG. 1.

Referring to FIG. 9, in operation S60, an operation for detecting an impedance between two pins is performed. According to some embodiments, to detect an impedance, the port controller 130 may apply a voltage and/or a current directly between any two pins from among pins included in the USB receptacle 110 other than power pins, or may control the termination circuit 120 to apply a voltage and/or a current thereto. For example, the port controller 130 may apply a test signal to at least one of a CC1 pin, a CC2 pin, a D+ pin, a D− pin, an SBU1 pin, an SBU2 pin, a TX1+ pin, a TX1− pin, a TX2+ pin, a TX2− pin, an RX1+ pin, an RX1− pin, an RX2+ pin, and an RX2− pin. An example of operation S60 will be described subsequently with reference to FIG. 10.

In operation S70, an operation is performed for determining whether there is an abnormal state based on an impedance. For example, when the detected impedance is low, the port controller 130 may recognize that a short circuit has occurred between the two pins, thereby determining an abnormal state. On the other hand, when the detected impedance is high, the port controller 130 may recognize that no short circuit has occurred between the two pins, thereby determining a normal state. An example of operation S70 will be described below with reference to FIG. 10.

Figure 10:
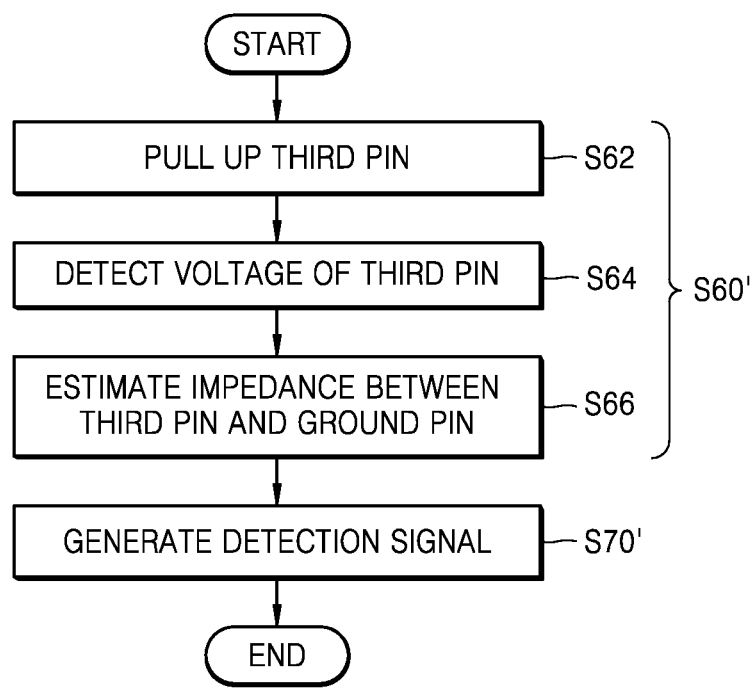
FIG. 10 illustrates a flowchart of a method of detecting an abnormal state, according to embodiments of the inventive concepts.

FIG. 10 illustrates a flowchart of a method of detecting an abnormal state, according to embodiments of the inventive concepts. For example, the method of FIG. 10 includes operation S60' and operation S70' as respective examples of operation S60 and operation S70 of FIG. 9. In detail, FIG. 10 shows a method of detecting an impedance between a third pin and a ground pin (e.g., the ground pin of FIG. 2).

Referring to FIG. 10, operation S60' includes a plurality of operations, that is, operation S62, operation S64, and operation S66. In operation S62, an operation for pulling up a third pin is performed. For example, the port controller 130 may pull up the third pin by using a switch circuit, a resistor, and/or a current source included in the termination circuit 120. Next, in operation S64, an operation for detecting the voltage of the third pin is performed. Since the third pin has been pulled up in operation S62, the voltage of the third pin may depend on an impedance between the third pin and a ground potential. In operation S66, an operation for estimating the impedance between the third pin and the ground pin is performed. For example, when the third pin has been pulled up by a pull-up resistor, the port controller 130 may estimate the impedance between the third pin and the ground pin based on the resistance of the pull-up resistor and the voltage of the third pin. Also, when the third pin has been pulled up by a current source, the port controller 130 may estimate the impedance between the third pin and the ground pin based on the current of the current source and the voltage of the third pin.

In operation S70', an operation for generating a detection signal DET is performed. For example, when the estimated impedance is low, the port controller 130 may generate an activated detection signal DET. On the other hand, when the estimated impedance is high, the port controller 130 may generate a deactivated detection signal DET.

Figure 11:
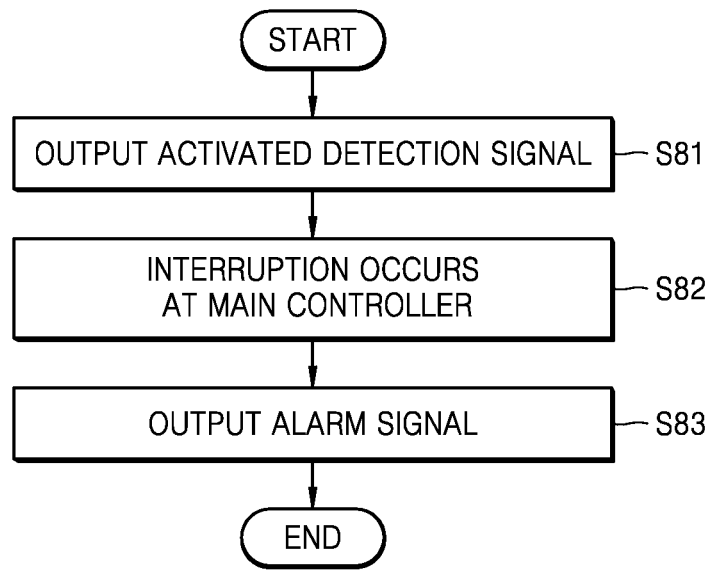
FIG. 11 illustrates a flowchart of a method of handling an abnormal state, according to embodiments of the inventive concepts.

FIG. 11 illustrates a flowchart of a method of handling an abnormal state according to embodiments of the inventive concepts. In detail, the method of FIG. 11 may be performed subsequently when abnormal states are determined in operation S12 of FIG. 5 and operation S20, operation S22, and operation S29 of FIG. 6, respectively. For example, when an abnormal state is determined in operation S20 of FIG. 6, operation S81, operation S82, and operation S83 of FIG. 11 may be performed, and then operation S20 of FIG. 6 may be performed. According to some embodiments, the method of FIG. 11 may be performed by the USB device 100 FIG. 1, and hereinafter, FIG. 11 will be described with reference to FIG. 1.

In operation S81, an operation for outputting an activated detection signal DET is performed. For example, the port controller 130 may generate the activated detection signal DET when an abnormal state is detected, and the main controller 150 may recognize the abnormal state by receiving the activated detection signal DET from the port controller 130.

In operation S82, an operation for causing an interruption of the main controller 150 is performed. For example, the detection signal DET may cause an interruption of the main controller 150. That is, the main controller 150 may be configured to enter an interruption state responsive to the activated detection signal DET. As described above with reference to the drawings, an abnormal state may induce leakage current, and excessive power consumption and damage may occur due to leakage current. Therefore, the main controller 150 may process the activated detection signal DET through interruption.

In operation S83, an operation for outputting an alarm signal S_ALA is performed. For example, the main controller 150 may output a control signal CTRL in response to the activated detection signal DET, such that the signal generator 160 generates the alarm signal S_ALA. Accordingly, a user of the USB device 100 may recognize the occurrence of an abnormal state and take necessary measures.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it should be understood by those of ordinary skill in the art that various changes in form and detail may be made therein without departing from the spirit and scope as defined by the following claims.

What is claimed is:

1. A device configured to provide a universal serial bus (USB) interface, the device comprising:
    a USB receptacle comprising a plurality of pins;
    a power circuit configured to generate at least one voltage;
    a switch configured to electrically connect a first pin of the plurality of pins and the power circuit in response to a switch control signal that is activated; and
    a port controller configured to apply a test signal to at least one pin of the plurality of pins and generate the switch control signal based on a response to the test signal.

2. The device of claim 1, further comprising a termination circuit configured to provide the USB receptacle with termination in accordance with the USB interface,
    wherein the port controller is further configured to apply the test signal to a second pin of the at least one pin by controlling the termination circuit.

3. The device of claim 2, wherein the port controller is further configured to:
    pull down the second pin and sense a first voltage of the second pin;
    when a waiting time has elapsed after pulling down the second pin, sense a second voltage of the second pin; and
    generate the switch control signal based on the first voltage and the second voltage.

4. The device of claim 3, wherein the port controller is further configured to:
    calculate a charge slope based on the waiting time and a difference between the first voltage and the second voltage; and
    generate the deactivated switch control signal when the charge slope is equal to or less than a first reference value.

5. The device of claim 2, wherein the port controller is further configured to:
    pull up the second pin and sense a first voltage of the second pin;
    when a waiting time has elapsed after pulling down the second pin, sense a second voltage of the second pin; and
    generate the switch control signal based on the first voltage and the second voltage.

6. The device of claim 5, wherein the port controller is further configured to:
    calculate a discharge slope based on the waiting time and a difference between the first voltage and the second voltage; and
    generate the deactivated switch control signal when the discharge slope is equal to or less than a second reference value.

7. The device of claim 1, wherein the first pin is different from the at least one pin.

8. The device of claim 7, wherein the USB receptacle is configured to support a USB Type-C™ standard,
    the first pin is a VBUS pin, and
    the at least one pin comprises at least one of a CC1 pin, a CC2 pin, a D+ pin, a D− pin, an SBU1 pin, an SBU2 pin, a TX1+ pin, a TX1− pin, a TX2+ pin, a TX2− pin, an RX1+ pin, an RX1− pin, an RX2+ pin, and an RX2− pin.

9. The device of claim 1, wherein the port controller is further configured to repeat applying the test signal at a pre-set period.

10. The device of claim 1, wherein the port controller is further configured to detect an attached state of being connected to a counter device based on the USB interface via the USB receptacle and apply the test signal when the attached state is detected.

11. A device configured to provide a universal serial bus (USB) interface, the device comprising:
    a USB receptacle comprising a plurality of pins;
    a power circuit configured to generate at least one voltage;
    a switch configured to electrically connect a first pin of the plurality of pins and the power circuit in response to a switch control signal that is activated; and
    a port controller configured to detect an impedance between at least two pins of the plurality of pins and generate the switch control signal based on the detected impedance.

12. The device of claim 11, further comprising a termination circuit configured to provide the USB receptacle with termination in accordance with the USB interface,
    wherein the port controller is further configured to detect a first impedance a third pin and a fourth pin of the at least two pins by controlling the termination circuit.

13. The device of claim 12, wherein the port controller is further configured to:
    pull up the third pin and sense a voltage of the third pin; and
    detect the first impedance between third pin and the fourth pin.

14. The device of claim 13, wherein the port controller is further configured to generate the deactivated switch control signal when the first impedance is less than or equal to a reference value.

15. The device of claim 11, wherein the first pin is different from the at least two pins.

16. The device of claim 15, wherein the USB receptacle is configured to support a USB Type-C™ standard,
    the first pin is a VBUS pin, and
    the at least two pin comprises at least two of a CC1 pin, a CC2 pin, a D+ pin, a D− pin, an SBU1 pin, an SBU2 pin, a TX1+ pin, a TX1− pin, a TX2+ pin, a TX2− pin, an RX1+ pin, an RX1− pin, an RX2+ pin, and an RX2− pin.

17. The device of claim 11, wherein the port controller is further configured to repeat detecting the impedance at a pre-set period.

18. The device of claim 11, wherein the port controller is further configured to detect an attached state of being connected to a counter device based on the USB interface via the USB receptacle and detect the impedance when the attached state is detected.

19. A method of ensuring power delivery in a universal serial bus (USB) interface, the method comprising:
pulling up or pulling down at least one pin of a plurality of pins included in a USB receptacle;
sensing at least one first voltage of the at least one pin at a first time;
sensing at least one second voltage of the at least one pin at a second time;
determining a rate of change of voltage of the at least one pin between the first time and the second time; and
turning on or turning off, based on the at least one first voltage and the rate of change of voltage of the at least one pin, a switch connected between a first pin of the plurality of pins and a power circuit configured to generate at least one voltage for the power delivery.

20. The method of claim 19, wherein the first pin is different from the at least one pin.

* * * * *